US008015482B2

(12) United States Patent
Simova et al.

(10) Patent No.: US 8,015,482 B2
(45) Date of Patent: Sep. 6, 2011

(54) DYNAMIC ANCHORING OF ANNOTATIONS TO EDITABLE CONTENT

(75) Inventors: Svetlana Ivanova Simova, Redmond, WA (US); Rafael Roberto Ruiz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1337 days.

(21) Appl. No.: 11/227,803

(22) Filed: Sep. 14, 2005

(65) Prior Publication Data

US 2007/0061704 A1 Mar. 15, 2007

(51) Int. Cl.
*G06F 17/00* (2006.01)

(52) U.S. Cl. ........................................................ 715/230

(58) Field of Classification Search .................. 715/201, 715/202, 205, 210, 225, 229, 230, 233, 234, 715/236, 239, 276, 512, 513, 700, 728, 738, 715/744, 764; 382/188; 717/114
See application file for complete search history.

(56) References Cited

U.S. PATENT DOCUMENTS

| | | | | |
|---|---|---|---|---|
| 5,600,775 A * | 2/1997 | King et al. | | 715/203 |
| 6,320,577 B1 * | 11/2001 | Alexander | | 345/440.1 |
| 6,324,555 B1 * | 11/2001 | Sites | | 715/234 |
| 6,529,215 B2 * | 3/2003 | Golovchinsky et al. | | 715/764 |
| 7,051,275 B2 * | 5/2006 | Gupta et al. | | 715/201 |
| 7,162,690 B2 * | 1/2007 | Gupta et al. | | 715/202 |
| 7,218,783 B2 * | 5/2007 | Bargeron et al. | | 382/188 |
| 7,506,262 B2 * | 3/2009 | Gupta et al. | | 715/751 |
| 7,793,212 B2 * | 9/2010 | Adams et al. | | 715/233 |
| 7,865,815 B2 * | 1/2011 | Albornoz et al. | | 715/229 |
| 7,913,162 B2 * | 3/2011 | Hansen et al. | | 715/230 |
| 2004/0205542 A1 * | 10/2004 | Bargeron et al. | | 715/512 |
| 2004/0205545 A1 * | 10/2004 | Bargeron et al. | | 715/512 |
| 2004/0230900 A1 * | 11/2004 | Relyea et al. | | 715/513 |
| 2004/0252888 A1 * | 12/2004 | Bargeron et al. | | 382/188 |
| 2004/0260702 A1 * | 12/2004 | Cragun et al. | | 707/100 |
| 2004/0260714 A1 * | 12/2004 | Chatterjee et al. | | 707/101 |
| 2004/0260717 A1 * | 12/2004 | Albornoz et al. | | 707/102 |
| 2004/0267798 A1 * | 12/2004 | Chatterjee et al. | | 707/102 |
| 2005/0160356 A1 * | 7/2005 | Albornoz et al. | | 715/512 |
| 2010/0063971 A1 * | 3/2010 | Cragun et al. | | 707/741 |

OTHER PUBLICATIONS

Control.OnParentChangedMethod, pp. 1 URL: <http://msdn.microsoft.com/en-us/library/system.windows.forms.control.onparentchanged>, Retrieved on May 4, 2011.*

* cited by examiner

*Primary Examiner* — Laurie Ries
*Assistant Examiner* — Mustafa Amin
(74) *Attorney, Agent, or Firm* — Workman Nydegger

(57) ABSTRACT

Described is the annotating of computer document content, particularly editable content, by saving annotations in a separate annotation store, and mapping the annotations back to the content. By mapping, no data are added to the original content at runtime, and only minimal data need be added to the content when persisted. An annotation is anchored to a piece of runtime content, such as upon creation of the annotation, by maintaining annotation data as well as start and end pointers mapped to the annotated piece. Upon saving the content, information (e.g., an anchor marker including an identifier) is persisted with the piece of content to allow the annotation to be re-anchored to the piece upon subsequent reload. For example, when loading content from persistent storage that includes an annotation identifier, the annotation identifier is processed to locate a start and end of the portion and an annotation in the annotation store.

15 Claims, 4 Drawing Sheets

DYNAMIC ANCHORING OF ANNOTATIONS TO EDITABLE CONTENT

BACKGROUND

Annotations are independent markings, notes and other miscellaneous information such as highlighting that is added to a document after the document (or at least part of it) is in some state in which it can be reviewed. Note that annotating is not the same as re-editing one draft document into a later version, but instead refers to adding material that is generally independent in meaning and semantics, e.g., something a reviewer previously would have done on a paper copy printout of the document. Today, annotating of electronic documents may be done by certain computer programs, such as word processing programs.

While some computer programs thus allow annotations to be electronically added to documents created by that program, there are many types of documents, programs and content formats that exist in contemporary computing. The programs that allow the addition of such annotations typically do so by inserting the annotations within the content, that is, directly into the content in a proprietary format. The annotations may be rendered according to the program, e.g., as footnotes, bubbles, superimposed handwritten notes, and so forth. Because the annotations are within the content, the ability to use a computer system to electronically annotate content and read back the annotations essentially depends on the program that created the content, or at least a similar program that understands the format.

SUMMARY

Briefly, various aspects of the present invention are directed towards annotating content, including editable content, by saving annotations in a separate annotation store, and mapping the annotations back to the content. No data are added to the original content at runtime, and only minimal data are added to the persisted content. To this end, an annotation is anchored to a piece of runtime content, such as upon creation of the annotation, in a manner that does not substantially alter the runtime content from the perspective of a program that has loaded the content. Upon saving the content, information (e.g., an anchor marker including an identifier) is persisted in association with the piece of content that allows the annotation to be re-anchored to the piece of content upon subsequent reload. The anchor mechanism may comprise start and end pointers that indicate the annotated piece of content relative to other content.

When loading content from persistent storage that includes an annotation identifier, the annotation identifier is processed to indicate a start and end of the portion. An annotation is then able to be associated with the portion based on the start and end data.

In one implementation, an annotation store maintains the sets of annotation information. A dynamic anchor manager converts the identifier into a mechanism (e.g., the start and end pointers) that anchors annotation information of one of the sets in the annotation store to the piece of runtime content, without substantially altering the runtime content.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
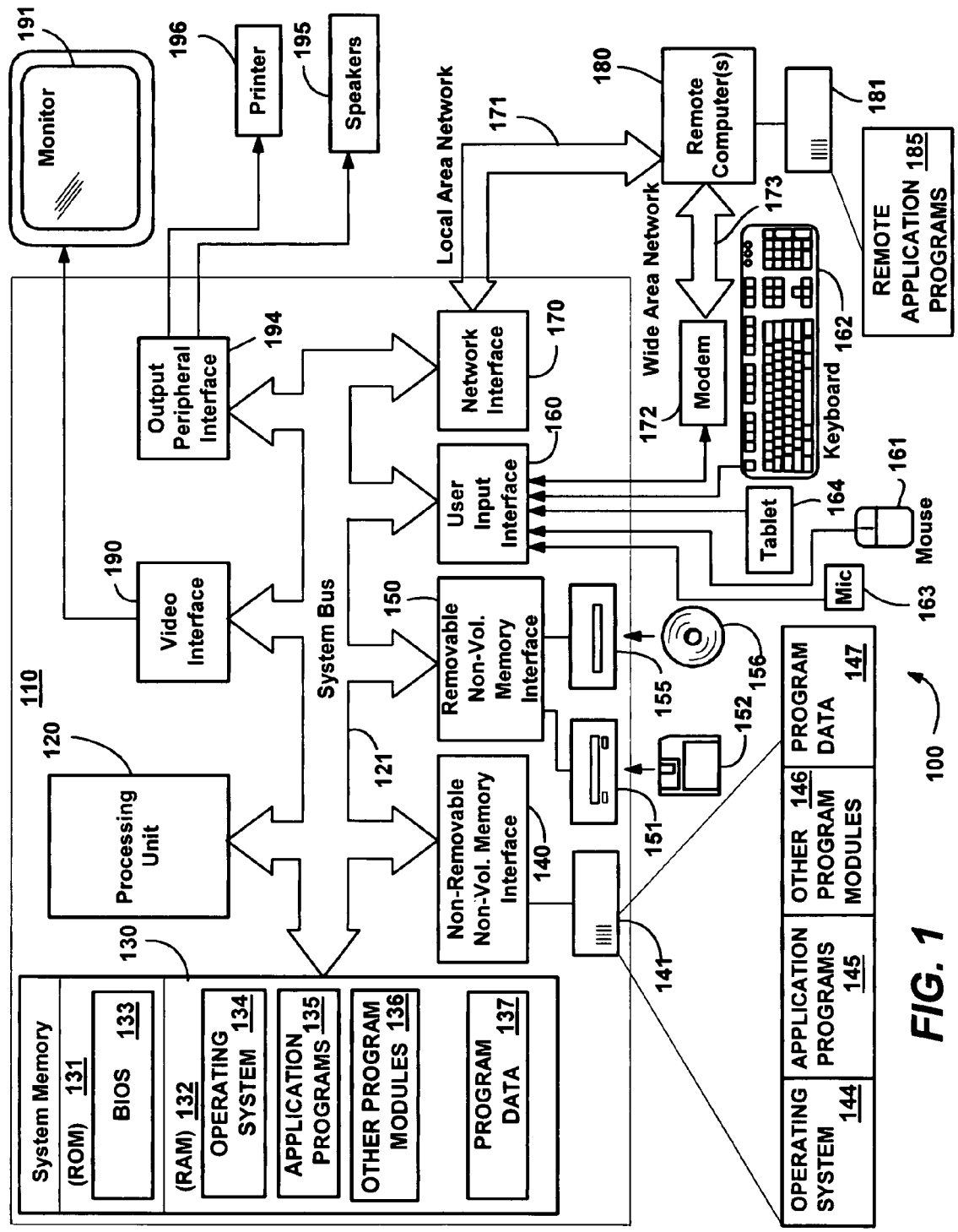
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Dynamic Anchoring of Annotations to Editable Content

Various aspects of the technology described herein are directed towards annotating content, particularly editable content, with any annotations saved in a separate annotation store. In general and as described below, no data are added to the content when it is loaded (that is, at runtime), and only minimal data need be added to the persisted content when saved. In one example implementation, this is accomplished in a text object model that generates annotation anchors in the format of an annotation framework, with tags placed in the persisted data and pointers associated with, but not maintained within, the content. However, as will be understood, the present invention is not limited to any particular model or framework. For example, as will be understood, annotations may be associated with (anchored to) graphics images in a document, anchored to a portion of video and/or audio, and so forth. As such, any of the examples mentioned herein are non-limiting, and the present invention may be used various ways that provide benefits and advantages in computing in general.

Figure 2:
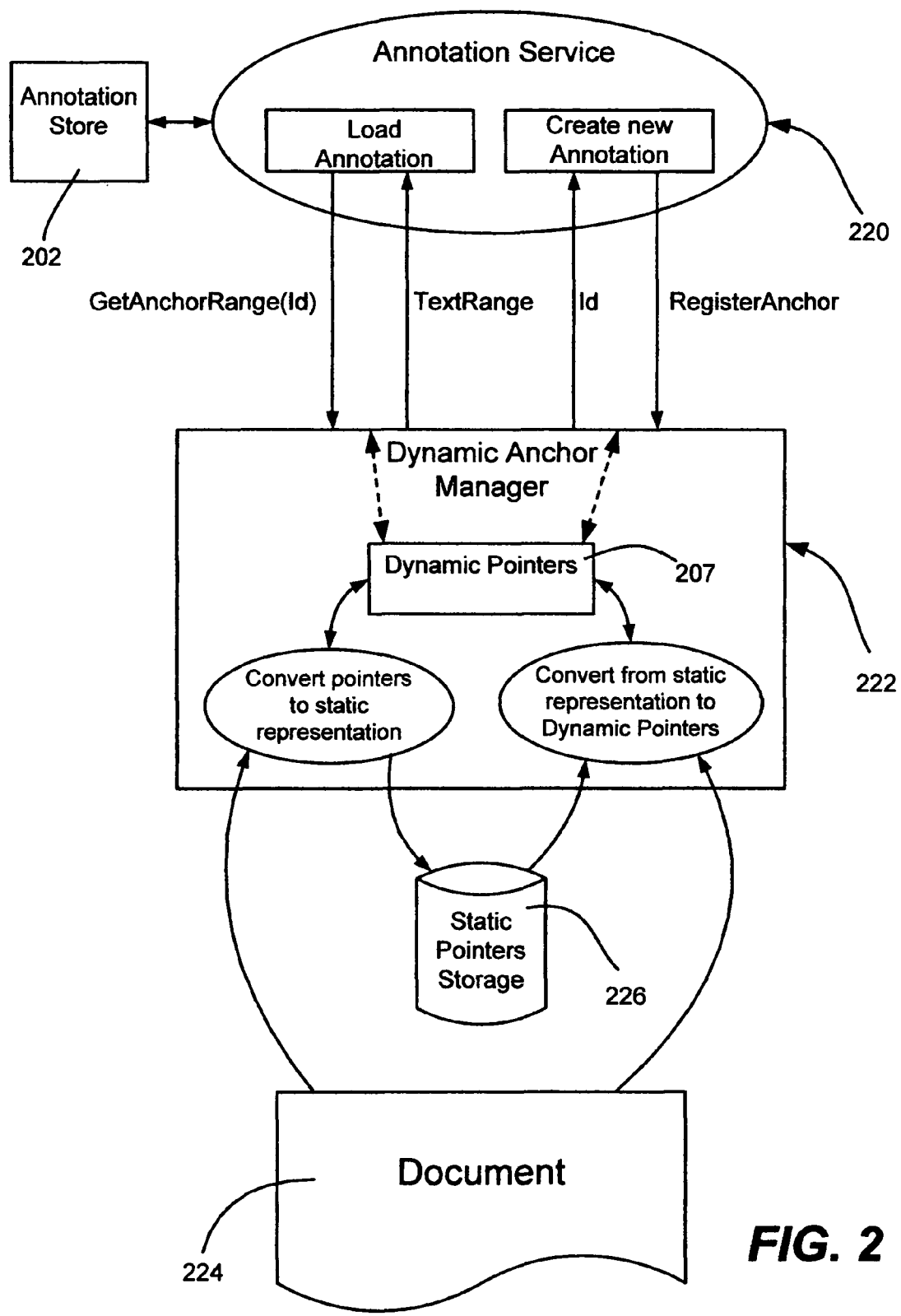
FIG. 2 is a representation of various aspects of creating, loading and persisting information for dynamically anchoring annotations to content.

Turning to FIG. 2 of the drawings, there is shown a block diagram generally representing an architecture in which an annotation service generally designated 220 works with an annotation store designated 202 and dynamic anchor manager 222 to annotate a content document 224. In general, and as described below, when the document is created or first loaded from storage into a computer system, annotations may be added to the document at locations corresponding to specified pieces of content. When in the loaded state, the annotation service 220 and dynamic anchor manager 222 do not merge the annotations into the corresponding annotated content, but rather maintain the annotations in an annotation store 202 separate from the annotated content. In order to associate the annotation information from the store 202 to the corresponding piece of content in the document 224, the dynamic anchor manager 222 maintains data referred to herein as pointers, or anchors.

To this end, in the document's loaded state, each annotation is dynamically anchored to selected content in the document 224 when the annotation is created. Upon saving the document into its persisted state, the annotations and anchors are also persisted in one of various ways, described below. Upon reloading the document, the annotation service 220 and dynamic anchor manager 222 use the persisted anchors to re-associate the persisted annotations with the same content. Thus, the dynamic anchor manager 222 loads existing anchors and creates new anchors associated with user-selected content in the document.

Upon serialization of the content to a persistent store, the pointers are converted back to a static representation thereof, e.g., represented as the static pointers storage 226. In this way, annotations can be rendered along with their associated content as if the annotations were part of the content, yet the document itself is not substantially altered, e.g., a copy of the same document loaded and parsed on a different machine may have the parser ignore the anchoring information and simply not render any annotations. To this end, the anchors are maintained in the static pointers storage 226. Note that the static pointers storage 226 may be maintained separately from the content document 224, or integrated into the content document or maintained in another file when persisted. The static form of the pointer can comprise any information suitable to maintain the location, e.g., a page number and offset, page number and X,Y position, or any other form that is appropriate for the type of document being processed.

This separation allows annotating any type of document, no matter how the data are formatted at runtime. As a result of the separation, the annotations are essentially invisible to the application program, whereby content editing is not affected by the presence of the annotations, e.g., actions such as inserting and deleting text or cutting and pasting function as if the annotations were not present.

Figure 3:
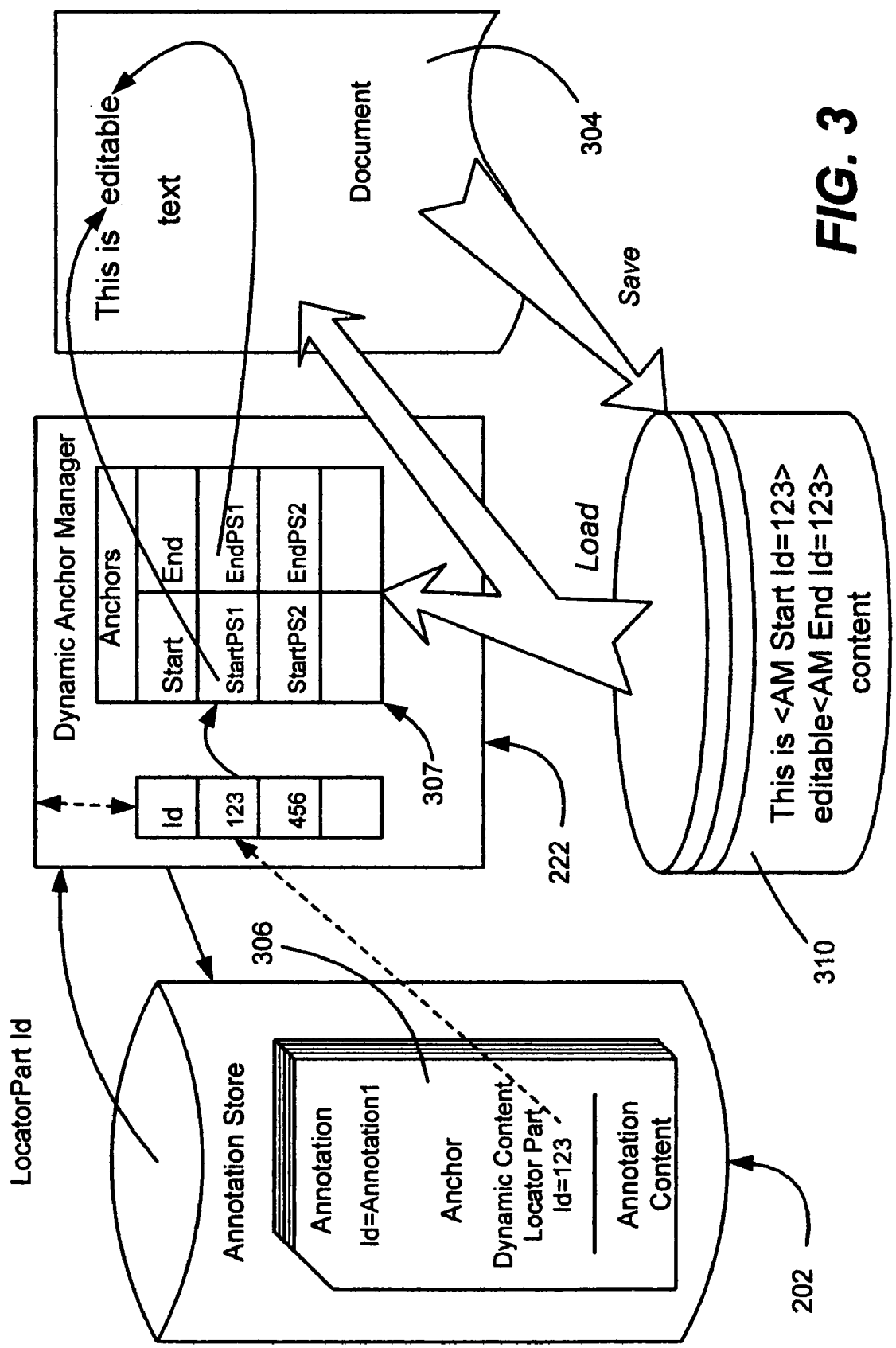
FIG. 3 is a block diagram representing an example set of components for dynamically anchoring annotations to content.

Exemplary annotation-related components of one example implementation are represented in FIG. 3. In this implementation, the annotations for a document are maintained in an annotation store 202 that is separate from the runtime instantiation of the document 304, (but in other implementations may be appended or otherwise directly associated with it). For each annotation, the annotation store 202 contains a set of annotation information 306, comprising a locator part identifier, "123" in this example, and the annotation content itself, which may be text, handwriting (e.g., in the form of electronic ink), formatting instructions, and so forth. Note that the annotation content may be a link to something else, e.g., a large audio file that annotates anchored content such as text, graphics or video.

In the example of FIG. 3, the annotation information 306 indicates that the word "editable" in the document 304 is to be highlighted in some way (a gray background is shown). Note however that rendering (or audio or video playback) may be done by a rendering component that is independent of the content and independent of the annotation itself, and thus, for example, the same annotation may be shown in one rendering as a footnote to the anchored piece of content, and in another rendering as a bubble or other side-note accompanying the anchored piece of content, and so forth.

The annotation may have its own identifier, as shown in the annotation information 306 as Annotation1, and for example may be used for searching. Note however, that such an annotation identifier is not related to the locator parts, and is not necessary for associating an annotation with a piece of content.

In the example implementation of FIG. 3, dynamic anchoring is achieved at runtime (that is when the document is loaded rather than in its serialized and persisted state) by holding a pair of pointers referencing the beginning and the end of the anchored content at runtime. This is represented in FIG. 3 by the start and end fields of each entry within an anchors table 307 of the dynamic anchor manager 222. As represented by the dashed arrow from the annotation to the appropriate identifier in the dynamic anchor manager 222, the reference pointers are associated with a locator part identifier that is recorded in a corresponding locator part of the annotation's information 306. This locator part identifier provides a link between the set of annotation information 306 that is independently stored in the annotation store 202, and the "real" (acting) anchor in the text or other piece of content that is defined by the two end pointers.

As described herein when the content is saved to a persistent memory 310, the pointers are converted to a static form and saved in a separate store (e.g., the pointers store 226 of FIG. 2), or alternatively added to the content of the document, if possible, such as in a package at the end of the document, or possibly in a hidden form, or even in an associated file.

In the example of FIG. 3, the dynamic pointers may be persisted for later recreation from tags (e.g., in XAML), referred to as anchor markers (<AM>), surrounding the annotated content. In other words, the anchor markers are integrated into the content when persisted, such that in this example, the persisted document contains information (e.g., XAML tags) sufficient to convert static data to the dynamic pointers upon reloading of the content having the associated annotations. In FIG. 3, each of the start and end anchor markers include a reference to the locator part identifier, "123" in this XAML example. In this manner, upon reloading and parsing the document, the tags can be removed and used to locate the locator part identifier, which in turn can be used to locate the annotation information, from which the annotation may be rendered with its associated content.

Thus, as can be seen, in the runtime state no annotation data is present in the content itself, but rather tags maintained in the persisted data (or elsewhere) are converted to anchors that point to the start and end of the content to be annotated. Upon load, the start and end anchor marker tags, via the locator part identifier, are used to find the corresponding annotation data (e.g., the annotation information including the pointer information and the annotation content that describes and/or contains the annotation to render, possibly along with a description of how to render). When serialized (saved) to the persistent store 310, the pointers are reconverted back to tags or other suitable form. In this manner, the annotations are essentially maintained independent of the runtime content, yet enough information is persisted with the serialized content to recreate the annotation for anchoring to its corresponding piece of content when the content is reloaded.

Returning to FIG. 2, the data in the dynamic pointers 207 (e.g., the anchors table 307 of FIG. 3) are provided upon creation of a new annotation, or upon the loading of content that was previously annotated. As described above, the annotation service generally designated 220 works with the dynamic anchor manager 222 to load existing anchors or create a new anchor associated with user-selected content, as described below.

In an example implementation, various aspects of such a mechanism may be implemented as an extension of an annotation framework, as generally described in U.S. patent application Ser. No. 10/966,950 filed Oct. 15, 3004, that allows annotating any type of control that uses a text container (e.g., TextContainer object) 448. In this example implementation, represented in FIG. 4, there are three main classes participating in the process, including anchor markers 446, the dynamic anchor manager 222, and a dynamic selection processor 414. In this example implementation, when persisted, each anchor marker may be a TextElement that is temporarily inserted at serialization time and saved to the persistent storage (e.g., 226 of FIG. 2 or 310 of FIG. 3).

The dynamic anchor manager 222 is an object (e.g., DynamicAnchorManager) that maintains the runtime anchors table 307, inserts and removes anchor markers during serialization and converts anchor markers to the text pointers (or other content locators) when content is loaded. However, there is no intention to limit dynamic anchoring as described herein to text, and the pointers may be locators to any type of content.

One example implementation for anchoring annotations to content allows for annotating any type of controls that use TextContainer, however any content that can be located in some manner that allows the content to be identified relative to other content may have an annotation anchored thereto. For example, a graphical image or text that does not reflow with the size of the window may be identified via a document, page number and X,Y coordinates. Other content may be identified by document, paragraph number, line and offset. Note that this works well with read-only content, such as of a web page, where no one edits the content and thus paragraphs cannot be inserted. In general, any way of identifying the location of a piece of content may be used to anchor an annotation to that content.

The dynamic selection processor 414 is an annotation framework selection processor which generates and resolves the dynamic content locator parts, thus managing the relationships between the anchors table 307 and the annotation store 202. One purpose of the dynamic selection processor 414 is to convert a text selection to a valid annotation framework locator part, e.g., via a DynamicSelectionProcessor.GenerateLocatorPart API, and to convert a valid locator part to a correct text selection, via a DynamicSelectionProcessor.ResolveLocatorPart API.

The DynamicSelectionProcessor.GenerateLocatorPart may comprise a simple method that generates a unique identifier, (e.g., a GUID or other per-store unique identifier), and passes this identifier along with the end points of the selection to the dynamic anchor manager 208. The API also generates a LocatorPart object with a name "DynamicTextRange" having the generated identifier as its data.

The DynamicSelectionProcessor.ResolveLocatorPart API takes a locator part (corresponding to the LocatorPart object) and converts it to a text selection. The text selection is generated based on the text pointers saved in the anchors table 307 of the dynamic anchor manager 222. Note, however, that any type of content may be selected for annotation.

In one example implementation, the anchor marker is a simple class (e.g., AnchorMarker) that has properties for setting and getting of the AnchorMarkerId (which is the same as the identifier of the corresponding LocatorPart) and the AnchorMarkerTagType (StartTag or EndTag). The values of those properties are kept in corresponding DependencyProperties of the AnchorMarker element so they can be deserialized/serialized, e.g., by a XAML parser (not specifically shown, but represented by the "load" and "save" arrows in FIG. 3 and generally described in U.S. patent application Ser. No. 10/439,505, filed May 16, 2003.

At the time of loading each AnchorMarker 446 registers itself with the DynamicAnchorManager 222. This is achieved by overriding OnParentChanged method of the TextElement. When invoked AnchorMarker.OnParentChanged checks if the old parent is null. If so, the element is inserted for the first time during a document (e.g., XAML) load. The element registers itself with the dynamic anchor manager 222 for this TextContainer. The registration may include saving the text position of the anchor marker and as start or end pointer of an anchor with the same identifier as the AnchorMarker identifier.

The dynamic anchor manager 222 controls the runtime information about the dynamic annotation anchors. For example, the dynamic anchor manager 222 may maintain the anchor table 307 as a hash table where the key is the anchor identifier as defined in the corresponding locator part and the value is a TextSegment defined by the start and end position of the dynamic annotation anchor. The start and end positions may comprise TextPointers which automatically provide the proper pointer adjustment when other content is inserted or deleted. Alternatively, by listening for insert or delete events, when data are inserted or removed in the document that influence the position of the annotated content, the start and/or end pointers may be accordingly adjusted by the dynamic anchor manager 308. For example, text insertion or deletion before a start and end pointer surrounding some text would move both pointers a corresponding number of characters; insertion or deletion between start and end pointers would move the end pointer; and insertion or deletion after the end pointer would not move either pointer.

Figure 4:
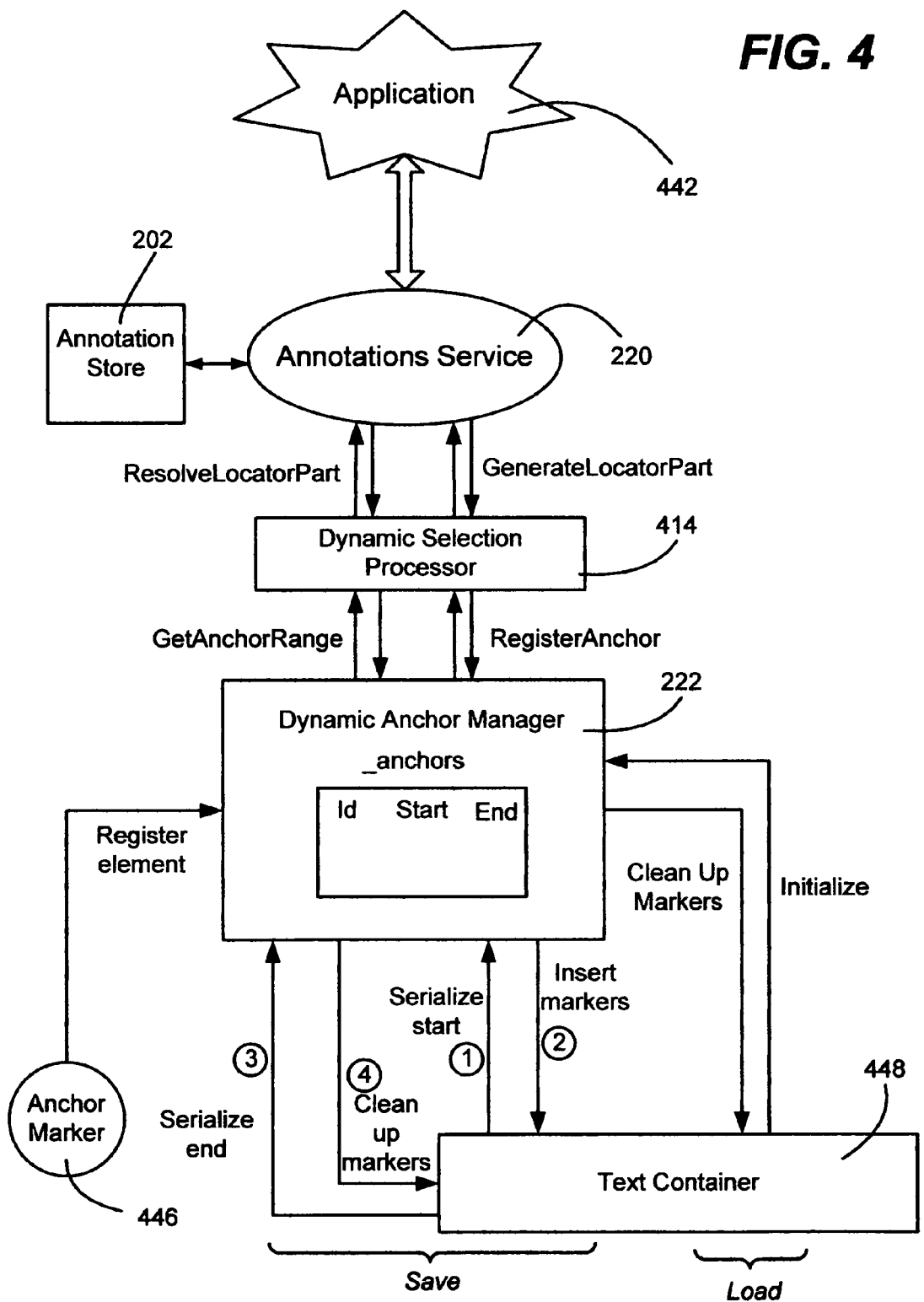
FIG. 4 is an example implementation representing an annotations service working with example components creating, loading and persisting information for dynamically anchoring annotations to content.

Turning to an explanation of the operation of the example implementation in an alternative representation generally shown in FIG. 4, when a new annotation is created via an application 442 or other program (such as an intermediate service, a hosted annotation program or control), the annotations service 220 calls the dynamic selection processor 414 to generate an appropriate locator part for a selection that will be annotated. As described above, the dynamic selection processor 414 generates a unique identifier and passes this identifier, along with the start point and end point of the selection, to the dynamic anchor manager 222 for storing.

The dynamic anchor manager 222 may listen to the appropriate events of the TextContainer 448. One such event is an "initialized" event. To this end, after the text container is initialized, the anchors table 207 is scanned, and for each entry the corresponding AnchorMarker startTag/endTag elements are found (if any) and are removed from the container.

The dynamic anchor manager 222 also persists the anchoring information when the XAML is serialized, and cleans up injected AnchorMarkers when the XAML serialization is finished. Note that the content that is serialized may be the same instance of content that is used at runtime, and serialization may be anytime when the user (or some timer) causes a save during runtime. If so, pointers need to be converted to tags, the tags serialized with the content, and then removed from the content.

An OnTextHostSerialize method is called when the text container serialization starts and ends. If this is a "start" event (as represented in FIG. 4 by the arrow accompanying circled numeral one), the dynamic anchor manager 222 inserts one start anchor marker and one end anchor marker element for each entry in the anchors table 207 (circled numeral two) into the text, as represented by the text container 448.

If this is an "end" event (circled numeral three), the anchor marker elements are cleaned up from the container (circled numeral four). In this manner, the anchor marker elements exist only during the TextContainer serialization. For the rest of the time, the content is clean, which ensures proper operation for copy/paste type operations and other editing operations.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-implemented method, comprising:
    providing an application programming interface (API) for managing annotations within content, the API comprising a DynamicSelectionProcessor.GenerateLocatorPart which converts a content selection to an annotation framework locator part, a DynamicSelectionProcessor.ResolveLocatorPart which converts the annotation framework locator part to a corresponding content selection;
    loading content from persistent storage to create a runtime content, the content including a portion thereof that is associated with an annotation identifier;
    processing the annotation identifier and determining a start of the portion and an end of the portion;
    upon loading the content, inserting one or more anchor markers into the runtime content, wherein each anchor marker is a simple class, AnchorMarker, which has properties for setting and getting an AnchorMarkerID, which is an identifier corresponding to the annotation framework locator part, and an AnchorMarkerTagType, the AnchorMarkerID and AnchorMarkerTagType properties being kept in a corresponding DependencyProperties of the each anchor marker to enable the properties to be serialized and deserialized;
    upon loading the content, each of the anchor markers registering itself with a DynamicAnchorManager by overriding an OnParentChanged method;
    converting at least one of the one or more anchor markers into content locators;
    maintaining anchor information in a dynamic anchor table, the anchor information corresponding to the portion within the runtime content;
    loading annotation information from a persistent store which is separate from the content, the annotation information comprising an annotation corresponding to the annotation identifier; and
    associating the annotation with the portion using the anchor information within the dynamic anchor table, the annotation corresponding to the start and end of the portion.

2. The method of claim 1 wherein processing the annotation identifier comprises using the annotation identifier to locate in an annotation store a set of annotation information that corresponds to the annotation.

3. The method of claim 1 further comprising, maintaining data for the start and the end of the portion in a dynamic anchor table.

4. The method of claim 2 wherein maintaining the data for the start and the end of the portion comprises dynamically adjusting the data as the content is edited.

5. The method of claim 1 wherein location data corresponding the start or end of the portion, or both, changes after loading the content, and further comprising, upon saving the content, persisting the location data as changed, and persisting the annotation identifier in association with the piece of content.

6. A computer program product comprising at least one computer-readable storage medium having encoded thereon computer-executable instructions, which when executed perform a method comprising:
    providing an application programming interface (API) for managing annotations within content, the API comprising a DynamicSelectionProcessor.GenerateLocatorPart which converts a content selection to an annotation framework locator part, and a DynamicSelectionProcessor.ResolveLocatorPart which converts the annotation framework locator part to a corresponding content selection;
    loading content from a persistent storage to create a runtime content;
    upon loading the content, inserting one or more anchor markers into the runtime content, wherein each anchor marker is a simple class, AnchorMarker, which has properties for setting and getting an AnchorMarkerID, which is an identifier corresponding to the annotation framework locator part, and an AnchorMarkerTagType, the AnchorMarkerID and AnchorMarkerTagType properties being kept in a corresponding DependencyProperties of the each anchor marker to enable the properties to be serialized and deserialized;
    upon loading the content, each of the anchor markers registering itself with a DynamicAnchorManager by overriding an OnParentChanged method;
    converting at least one of the one or more anchor markers into content locators;
    anchoring an annotation to a piece of runtime content without altering the runtime content from the perspective of a program that has loaded the content, the annotation comprising a locator part identifier and a selection endpoint which provides a link between the annotation and the piece of runtime content;
    maintaining a runtime anchor table to manage a relationship between the annotation and the runtime content; and
    upon saving the content, persisting annotation information in an annotation store, the annotation store being separate from the content to which the annotation is anchored, the annotation information comprising data associated with the annotation and the piece of content, the annotation information allowing the annotation to be re-anchored to the piece of content upon the content being subsequently reloaded into a subsequent instance of runtime content.

7. The computer program product of claim 6 wherein anchoring the annotation to the piece of runtime content comprises associating start and end pointers that indicate the piece relative to at least one other piece of the content.

8. The computer program product of claim 7 further comprising, dynamically updating at least one of the start and end pointers as the content is edited.

9. The computer program product of claim 7 wherein associating the start and end pointers with the piece comprises accessing an annotation store based on an identifier corresponding to the piece.

10. The computer program product of claim 8 wherein the identifier is maintained with a previously persisted instance of the content, and further comprising, resolving the identifier into the start and end pointers.

11. The computer program product of claim 8 wherein the identifier is generated upon creation of the annotation, and wherein anchoring the annotation to a piece of runtime content comprises maintaining the start and end pointers in association with the identifier.

12. The computer program product of claim 6 wherein persisting the information in association with the piece of content comprises writing the information to a store that is separate from the content.

13. The computer program product of claim 6 wherein persisting the information in association with the piece of content comprises adding pointer data to the content that includes an identifier corresponding to the annotation.

14. The computer program product of claim 13 wherein adding the pointer data comprises surrounding the piece of content with a XAML start tag including the identifier and a XAML end tag including the identifier.

15. The computer program product of claim 6 further comprising, maintaining the annotation as annotation information in an annotation store.

* * * * *